United States Patent
Gurevich et al.

(10) Patent No.: US 6,786,413 B2
(45) Date of Patent: Sep. 7, 2004

(54) PRODUCTION OF AIMING SPOT WITH ENHANCED VISIBILITY IN ELECTRO-OPTICAL READERS FOR READING INDICIA

(75) Inventors: Vladimir Gurevich, Stony Brook, NY (US); Daniel Gonzalez, Setauket, NY (US); Mark Krichever, Hauppague, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 70 days.

(21) Appl. No.: 10/323,044

(22) Filed: Dec. 19, 2002

(65) Prior Publication Data

US 2004/0118924 A1 Jun. 24, 2004

(51) Int. Cl.[7] .................... G02B 26/00; G06K 7/10
(52) U.S. Cl. .................... 235/462.4; 235/462.21; 359/216
(58) Field of Search .................... 235/462.4, 462.38, 235/462.39, 462.2, 462.21, 462.01, 454; 359/216, 217, 218, 219, 220, 221

(56) References Cited

U.S. PATENT DOCUMENTS

| | | | | |
|---|---|---|---|---|
| 4,841,129 A | * | 6/1989 | Tawara et al. | 235/462.39 |
| 4,889,418 A | * | 12/1989 | Benjamin | 359/217 |
| 5,039,184 A | * | 8/1991 | Murakawa et al. | 359/216 |
| 5,146,463 A | * | 9/1992 | Rando | 235/462.21 |
| 5,459,308 A | * | 10/1995 | Detwiler et al. | 235/462.4 |
| 5,484,990 A | * | 1/1996 | Lindacher et al. | 235/462.39 |
| 6,053,409 A | * | 4/2000 | Brobst et al. | 235/462.36 |
| 6,223,986 B1 | * | 5/2001 | Bobba et al. | 235/462.2 |
| 2002/0104886 A1 | * | 8/2002 | Martin et al. | 235/462.45 |

* cited by examiner

Primary Examiner—Jared J. Fureman
(74) Attorney, Agent, or Firm—Kirschstein, et al.

(57) ABSTRACT

Curved reflecting surfaces on a rotary scan component produce an aiming spot of enhanced visibility during a single scan line mode of operation for an electro-optical reader capable of reading bar code symbols in a multiple scan line mode of operation.

17 Claims, 2 Drawing Sheets

PRODUCTION OF AIMING SPOT WITH ENHANCED VISIBILITY IN ELECTRO-OPTICAL READERS FOR READING INDICIA

BACKGROUND OF THE INVENTION

1. Field of the Invention

The present invention generally relates to electro-optical readers for reading indicia having parts of different light reflectivity, such as bar code symbols, during a multiple scan line mode and, more particularly, to an arrangement for, and a method of, producing an aiming spot with an enhanced visibility during a single scan line mode.

2. Description of the Related Art

Various electro-optical readers and scanning systems have been developed heretofore to read indicia such as bar code symbols applied to objects in order to identify the object by optically reading the symbol thereon. The bar code symbol itself is a coded pattern comprised of a series of bars of various widths, and spaced apart from one another to bound spaces of various widths, said bars and spaces having different light-reflecting characteristics. The readers electro-optically decoded the coded pattern to a multiple alpha-numerical digital representation descriptive of the object. Scanning systems of this general type have been disclosed, for example, in U.S. Pat. No. 4,251,798; U.S. Pat. No. 4,360,798; U.S. Pat. No. 4,369,361; U.S. Pat. No. 4,387,297; U.S. Pat. No. 4,409,470; U.S. Pat. No. 4,460,120 and U.S. Pat. No. 4,835,374, all of which have been assigned to the same assignee as the instant application.

As disclosed in some of the above patents, a particularly advantageous embodiment of such a scanning system resided, inter alia, in emitting a laser light beam from a hand-held, portable laser scanning head which was supported by a user; aiming the head and, more particularly, the laser light beam, at a symbol to be read; repetitively scanning the laser beam in a series of scan lines across the symbol; detecting the scanned laser light which is reflected off the symbol; and decoding the detected reflected light. Inasmuch as the laser light beam was usually, but not always, generated by a helium-neon gas laser which emitted red laser light at a wavelength of about 6328 Angstrom units, the red laser light was visible to the user and, thus, the user, without difficulty, could properly aim the head and position and maintain the emitted red laser light on and across the symbol during the scanning.

However, in the event that the laser light beam was generated by a semiconductor laser diode, as, by way of example, see U.S. Pat. No. 4,387,297; U.S. Pat. No. 4,409,470 and U.S. Pat. No. 4,460,120, then the aiming of the head relative to the symbol was rendered more difficult when the laser diode emitted laser light which was not readily visible to the user. For some laser diodes, the laser light was emitted at a wavelength of about 7800 Angstrom units, which was very close to infrared light and was on the borderline of being visible. Even with the advent of laser diodes whose emitted light was in the visible wavelength range, ambient light tended to mask out the laser diode light. Furthermore, if the laser diode light was moving, for example, by being swept across the symbol, and especially if the laser diode light was being swept at fast rates of speed on the order of a plurality of times per second, for example, at a rate of 40 scans per second, then the laser diode light was not readily visible to the user, even in a darkened room. Hence, due to one or more of such factors as the wavelength of the laser light, the intensity of the laser light, the intensity of the ambient light in the environment in which the laser light was operating, the scanning rate, as well as other factors, the laser diode light was rendered "non-readily visible".

This non-readily visible laser diode light did not enable the user, however, to readily aim the laser diode light at the symbol, at least not without some difficulty and practiced effort because, simply put, the user could not see the laser diode light. The user, therefore, was required to hunt around by trial and error, hope that the scanning laser diode light was eventually properly positioned on and across the symbol, and wait until the scanning system advised him, typically by the lighting of an indicator lamp or by the sounding of an auditory beeper, that the symbol had indeed been successfully decoded and read. This hunting technique was a less-than-efficient and time-consuming procedure for reading symbols, particularly in those applications where a multitude of symbols had to be read every hour and every day.

In an attempt to enable the user to readily aim the laser diode light at the symbol, U.S. Pat. No. 4,835,374 proposed an aiming light arrangement to assist the user in visually locating and aiming the head at each symbol when non-readily-visible laser light was employed. The aiming light arrangement utilized a visible light source, e.g., one or more light emitting diodes, which was separate and distinct from the laser light source. A manually-operated trigger was employed to actuate the aiming light arrangement in a first operational state of the trigger for visibly illuminating a region on the symbol. This visible region was used for aiming purposes. Thereupon, in a second operation state of the trigger, the laser light source was actuated, thereby initiating the reading of the symbol.

Although the use of a discrete aiming light arrangement did assist the user in reliably aiming the head at the symbol, it was disadvantageous, primarily because it made the head bigger, heavier and less energy-efficient. The discrete light emitting diodes added some weight to the head, occupied space within the head, required separate electrical power and control circuitry, and consumed electrical power. It is desirable to make the head of such systems as lightweight, miniature, and efficient as possible.

Another advantageous embodiment of such a scanning system resided, among other things, in emitting the laser beam from a hands-free system which was not, or not always, supported by the user. The system was built into a stationary counter, or was configured as a workstation supported on a support surface for hands-free operation. In some installations, the head was removably supported in a stationary cradle for both hands-free and hand-held operation. Typically, the object bearing the symbol was brought to the hands-free system, rather than bringing the system to the symbol as was done with hand-held readers.

In any event, for both hand-held and hands-free operation, but especially for the latter, the laser beam was swept by a plurality of mirrors to create an omni-directional scan pattern having many intersecting scan lines. The symbol brought to the hands-free system would inevitably be read by one of the scan lines.

As advantageous as this multiple scan line pattern was in reading symbols, the visibility of each scan line suffered since the light intensity of the laser beam emitted by the laser diode had to be shared among all the scan lines. In a typical scenario, a rotating scan component having a plurality of mirrors, also known as a mirrored polygon, was rotated to reflect the laser beam to an array of additional reflectors for reflection to the symbol. The number of mirrors multiplied by the number of reflectors yielded a product signifying how many scan lines would be generated and, of source, the intensity of each scan line is the reciprocal of the product. The greater the number of scan lines, the dimmer each scan line, and the harder it is for the operator to see whether any scan line is registered with the symbol.

The problem of a dim scan line is particularly important when the operator wishes to read a symbol from a pick list. Many objects, due to their small size, cannot be printed with a symbol, or cannot be associated with packaging or a tag on which the symbol can be printed. For example, individual hardware such as screws, nails and like fasteners fit in this category. In order to process such objects, a printed catalog, known as a pick list, has a picture or description of each such object adjacent an appropriate identifying symbol. The operator at the check-out counter reads the symbol from the pick list by aiming one of the scan lines at the symbol. If the scan line is dim, then this aiming procedure is compromised.

SUMMARY OF THE INVENTION

Objects of the Invention

Accordingly, it is a general object of this invention to avoid the above drawbacks of the prior art readers.

More particularly, it is an object of the present invention to eliminate discrete aiming light arrangements.

Still another object of the present invention is to enable a user to readily aim a laser beam emitted by a semiconductor laser diode on and across a symbol.

It is yet another object of the present invention to eliminate the trial-and-error hunting techniques, particularly at long working distances, in aiming a semiconductor laser diode beam at a symbol.

A still further object of the present invention is to increase the efficiency and reduce the time involved in optically reading a symbol with a semiconductor laser diode beam.

A concomitant object of the present invention is to accurately locate a symbol with a semiconductor laser diode-based scanner.

FEATURES OF THE INVENTION

In keeping with the above objects and others which will become apparent hereinafter, one feature of the present invention resides, briefly stated, in a reader for electro-optically reading indicia by reflecting a light beam off a plurality of generally planar light reflecting surfaces rotatable about an axis to sweep the light beam at a visibility across the indicia during a multiple scan line mode of operation. This invention proposes an arrangement for, and a method of, producing an aiming spot of enhanced visibility brighter than said visibility during a single scan line mode of operation.

In accordance with this invention, an actuatable light source is operative for producing the light beam; and an optical assembly is operative for directing the light beam along a path to the generally planar reflecting surfaces and to the indicia to be read. More particularly, a curved light reflecting surface is mounted for joint rotation with and between two of the generally planar reflecting surfaces. The curved reflecting surface is movable across the path. A controller is operative for actuating the light source during the single line mode to produce the light beam during movement of the curved reflecting surface across the path. The curved reflecting surface has a center of curvature on the axis for reflecting, and not sweeping across the indicia, the light beam incident on the curved reflecting surface at an angle of reflection which is substantially constant during movement of the curved reflecting surface across the path.

Hence, in accordance with this invention, an aiming spot of enhanced visibility is produced. During the single line mode, the light source is energized for only a small portion of each entire rotation of the reflecting surfaces. Preferably, the light source is energized shortly before the curved reflecting surface enters the path, and is deenergized shortly after the curved reflecting surface exits the path. A scan line is produced while the light source is energized. However, during the travel of the curved reflecting surface, the light beam is not swept and lingers on the symbol due to its constant center of curvature. The lingering beam forms a spot of greater visibility, and this spot is advantageously used for the aiming purposes described above.

In the preferred embodiment, all the reflecting surfaces are incorporated into a rotary scan component having the reflecting surfaces successively arranged in a circumferential direction about the axis. Additional curved light reflecting surfaces, each having the same center of curvature and each being mounted for joint rotation with and between adjacent pairs of the generally planar reflecting surfaces, may be incorporated into the scan component. Each curved reflecting surface is a circular arc.

Preferably, rotation of the scan component is maintained during both modes. The light source produces the light beam throughout the multiple line mode. However, the light source produces the light beam during the single line mode during movement of the curved reflecting surface across the path, but for only a fraction of each rotation of the scan component. Thus, the duty cycle of the light source during the single line mode is kept low.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
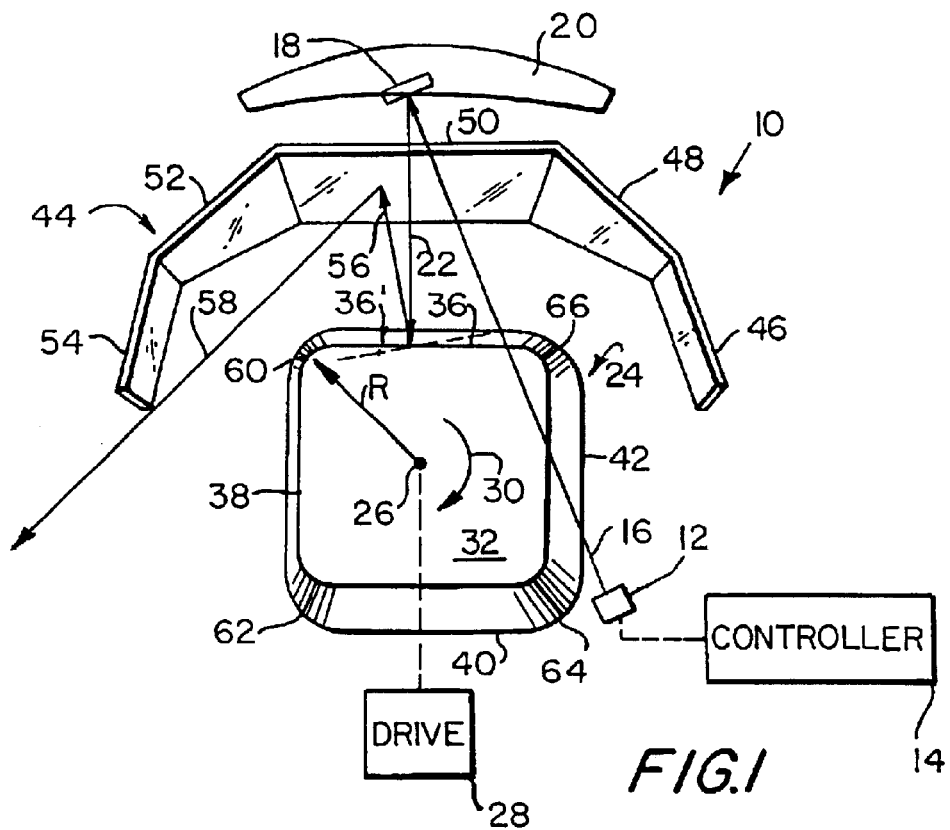
FIG. 1 is a schematic top view of an arrangement in accordance with this invention during a multiple scan line mode of operation of an electro-optical reader.
Figure 2:
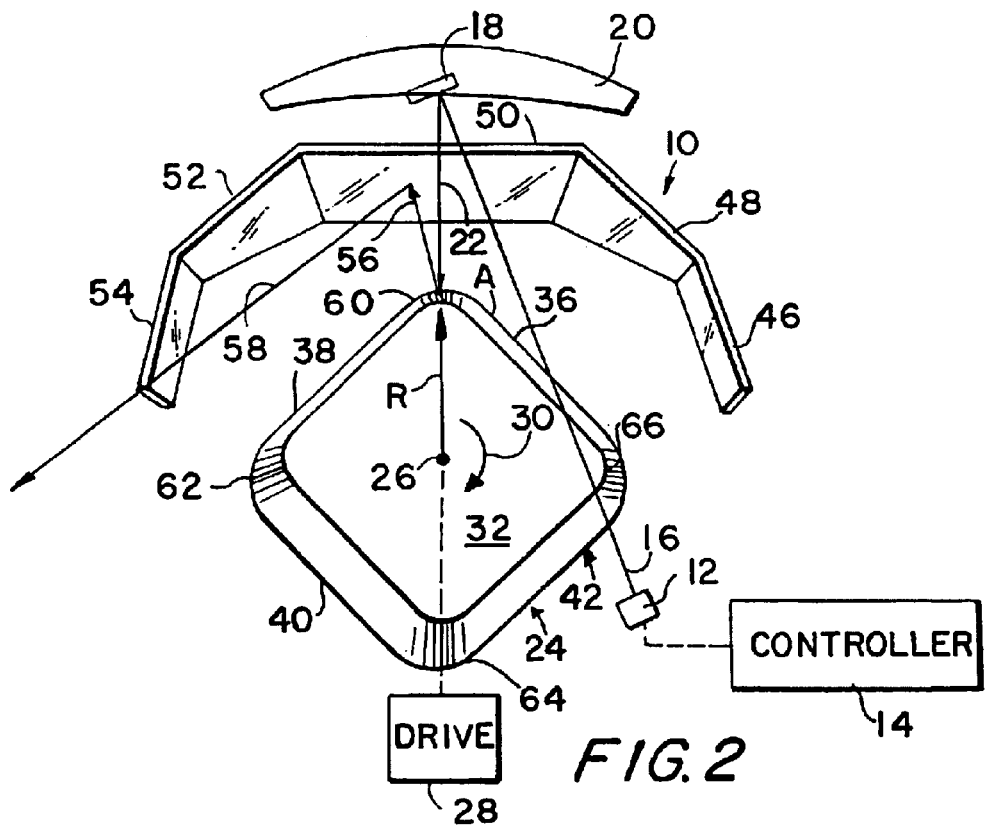
FIG. 2 is a view analogous to FIG. 1 but during a single scan line mode of operation.

Referring to the drawings, reference numeral 10 generally identifies certain components in a reader for electro-optically reading indicia, such as bar code symbols, during a multiple scan line mode (FIG. 1), and for producing an aiming spot during a single scan line mode (FIG. 2). The reader 10 includes a light source 12 such as a semiconductor laser diode, preferably having a wavelength of 650 nm for increased brightness. A controller 14, preferably a microprocessor, energizes and deenergizes the source 12 to emit a laser light beam 16 when desired, as described below. This laser beam 16 is directed to a folding mirror 18 mounted on a concave collection mirror 20.

Figure 3:
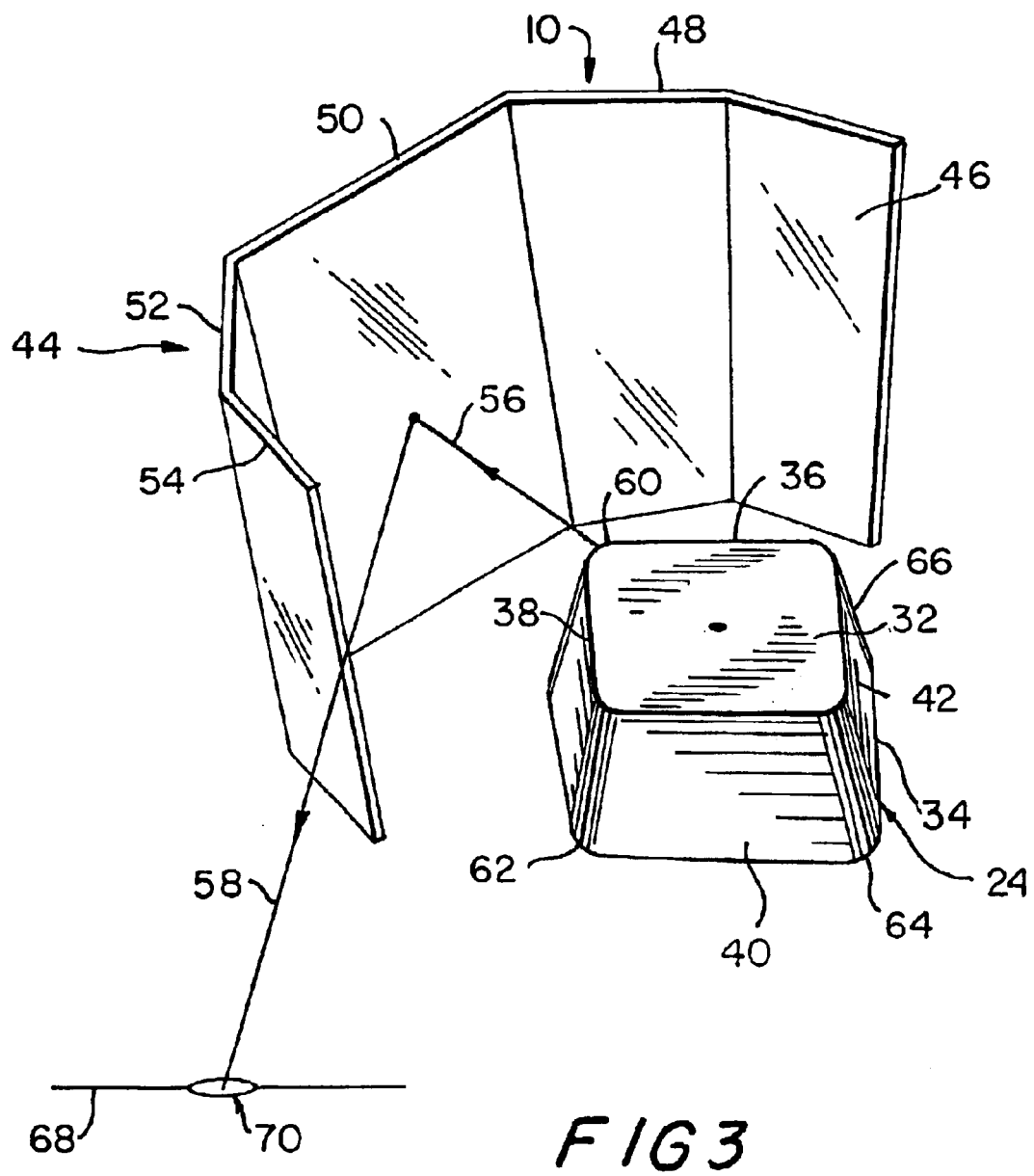
FIG. 3 is a perspective view of a detail of FIG. 2 and showing the aiming spot produced by this invention.

The folding mirror 18 reflects the beam 16 as a reflected beam 22 to a rotary scan component 24 mounted for rotation about an axis 26 and driven by a drive or motor 28 in a circumferential direction indicated by arrow 30. The component 24, as shown in FIG. 3, is shaped as a frusto-pyramid having generally planar top 32 and bottom 34 walls in mutual parallelism, and a plurality of generally planar side walls, each side wall having a generally planar light reflecting surface 36, 38, 40, 42. These reflecting surfaces can be achieved by affixing a mirror on each side wall, or, as preferred, by molding the component out of a plastic material and spraying the exterior with a light reflective coating. Each side wall is inclined at a different angle of inclination relative to the axis 26. As shown, the component 24 has four sides, but any number of sides can be used. As described so far, the component 24 is conventional and is commonly called a polygon mirror.

The beam 22 is reflected off each side wall successively positioned in its path as a reflected beam 56 to an array 44 of reflectors, also conventional and commonly called a crown mirror. The array 44 includes a plurality of reflectors 46, 48, 50, 52, 54 arranged in the circumferential direction about axis 26. Each reflector is inclined at a different angle of inclination relative to the axis 26. As shown, the array 44 has five reflectors, but any number of reflectors can be used.

The reflected beam 56 is reflected off each reflector as a plurality of reflected beams 58 during turning movement of each side wall of the component 24. The beams 58 are directed to the symbol to be read. Thus, in the example shown, during the multiple scan line mode, five scan lines from the five reflectors 46–54 are generated during turning of side wall 36, and five more scan lines are generated during turning of side wall 38, and so on. A total of twenty scan lines are generated for each full rotation of the component 24. There are five sets of four scan lines spatially intersecting in space at the symbol. The intensity of the light beam 16 emitted from the source 12 is distributed among these twenty scan lines and, hence, each scan line has one-twentieth the intensity as the beam 16.

The intensity of each scan line is further dimmed by the rate of rotation of the component 44 which preferably is rotated at a rate on the order of 60 revolutions per second. The dimness of each scan line is the technical problem to be solved by this invention, especially in a single scan line mode of operation, in which it is desired to register or aim the scan line on a symbol. In the pick list example given above, each symbol is located in a narrow zone on the preprinted list. It is not possible to use all twenty scan lines since they extend over a space much larger than that occupied by a single symbol and, in fact, would cover several symbols on the list. This is why a single scan line mode of operation is desired even for a multiple line reader, and it is during this single line mode when the visibility of the scan line, or at least an aiming spot thereof, is desired to be enhanced.

In accordance with this invention, a curved light reflecting surface and, in the embodiment shown, four curved light reflecting surfaces 60, 62, 64, 66 are mounted for joint rotation with and, in fact, are incorporated with the scan component 24. Each curved surface is located between two of the planar surfaces. Thus, as shown, representative curved surface 60 is located between planar surfaces 36, 38. All four corners of the component 24 are rounded, and each curved surface is a circular arc whose center of curvature R is the same and is located on the axis 26.

It will be recalled that, during the multiple line mode, each planar reflecting surface sweeps the light beam across all the reflectors. Thus, the planar surface 36 in FIG. 1 presents a different plane (see dashed line 36') or different angle of incidence to the incident beam 22 as the planar surface 36 is turned. The differently oriented plane of the planar surface 36 directs the reflected beam 56 to and across the reflectors 46, 48, 50, 52 and 54, each in its turn.

Now, during the single line mode, the controller 14 energizes the source 12 to emit the beam 16 shortly before the representative curved surface 60 enters the path of the incident beam 22, and deenergizes the source 12 to prevent emission of the beam 16 shortly after the curved surface 60 exits the path of the incident beam 22. Hence, the source is energized at point A in FIG. 2 when the beam 22 is incident on the planar surface 36 and is deenergized at point B where the beam 22 is incident on the next planar surface 38. Preferably, the arcuate distance between points A and B is on the order of 14°.

While the incident beam 22 is on the planar surfaces 36, 38, the reflected beam 56 is swept just as before since the plane of each of the planar surfaces 36, 38 is changing during rotation. However, while the incident beam 22 is on the curved surface 60, the reflected beam 56 is not being swept since the same angle of incidence is being presented to the incident beam. As earlier stated, the center of curvature R for the curved circular surface 60 is constant. Since the reflected beam 56 is not being swept, a stationary elliptical spot 70 (see FIG. 3) is created at the center of a scan line 68. This spot 70 has an enhanced visibility since the reflected beam 56 is lingering or dwelling at this area. Preferably, the source 12 is energized and deenergized in like manner for each of the successive curved surfaces 62, 64, 66. This creates several overlapping stationary spots which together even further enhance the brightness of the composite spot 70.

The spot 70 is elliptical and elongated along the scan line. This is not ideal for reading bar code symbols because it is preferred to have a shorter beam cross-section along the scan line. The elongation of the spot 70 can be decreased by changing the radius of each curved surface. However, changing the radius will cause the spot to move. Hence, optimization of the radius of curvature of each curved surface from zero to infinity depends on a trade-off between brightness of the spot 70 and reader performance.

As shown, each curved reflecting surface extends all the way between the top 32 and bottom 34 walls of the component 24 and has a part-cylindrical shape. Each curved surface could have a part-conical shape and need not extend all the way between the component walls 32, 34.

The energization and deenergization of the source at precise angular locations before and after each curved surface is achieved by using conventional position encoders mounted on the shaft of the component 24. Typically, an infrared emitter and detector is used to set an initial reference position from which further angular measurements are determined.

The switching between the single line and multiple line modes can be achieved in many ways. For example, a dual position trigger is advantageously employed, where depression of the trigger to one position sets the single line mode, and depression of the trigger to another position sets the multiple line mode.

It will be understood that each of the elements described above, or two or more together, also may find a useful application in other types of constructions differing from the types described above.

While the invention has been illustrated and described as embodied in producing an aiming spot with enhanced visibility in electro-optical readers for reading indicia, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a reader for electro-optically reading indicia by reflecting a light beam off a plurality of generally planar light reflecting surfaces rotatable about an axis to sweep the light beam at a visibility across the indicia during a multiple scan line mode of operation, an arrangement for producing an aiming spot of enhanced visibility brighter than said visibility during a single scan line mode of operation, the arrangement comprising:
   a) an actuatable light source for producing the light beam;
   b) means for directing the light beam along a path to the generally planar reflecting surfaces and to the indicia to be read;
   c) a curved light reflecting surface mounted for joint rotation with and between two of the generally planar reflecting surfaces, and being movable across the path;
   d) a controller for actuating the light source during the single line mode to produce the light beam during movement of the curved reflecting surface across the path; and
   e) the curved reflecting surface having a center of curvature on the axis for reflecting, and not sweeping across the indicia, the light beam incident on the curved reflecting surface at an angle of reflection which is substantially constant during movement of the curved reflecting surface across the path, thereby producing the aiming spot of enhanced visibility.

2. The arrangement of claim 1, wherein the light source is a laser.

3. The arrangement of claim 1, wherein the directing means includes a plurality of stationary light reflectors successively arranged in a circumferential direction about the axis, and wherein the reflectors receive light reflected from the reflecting surfaces and direct the received light toward the indicia to be read.

4. The arrangement of claim 1, wherein the reflecting surfaces are incorporated into a rotary scan component having the reflecting surfaces successively arranged in a circumferential direction about the axis.

5. The arrangement of claim 4, and further comprising additional curved light reflecting surfaces, each having the same center of curvature and each being mounted for joint rotation with and between adjacent pairs of the generally planar reflecting surfaces.

6. The arrangement of claim 5, wherein each curved reflecting surface is a circular arc.

7. The arrangement of claim 1, wherein the controller is operative for actuating the light source before the curved reflecting surface enters the path, and for deactuating the light source after the curved reflecting surface exits the path.

8. The arrangement of claim 1, wherein rotation of the reflecting surfaces is maintained during both modes, and wherein the light source produces the light beam during the multiple line mode, and wherein the light source produces the light beam during the single line mode during movement of the curved reflecting surface across the path.

9. A scan component rotatable about an axis, comprising:
   a) a plurality of generally planar light reflecting surfaces successively arranged in a circumferential direction about the axis, each generally planar reflecting surface being operative for reflecting and sweeping a light beam at a visibility along a path to and across indicia to be read by an electro-optical reader during a multiple scan line mode of operation; and
   b) a curved light reflecting surface mounted for joint rotation with and between two of the generally planar reflecting surfaces, and being movable across the path during a single scan line mode of operation, the curved reflecting surface having a center of curvature on the axis for reflecting, and not sweeping across the indicia, the light beam incident on the curved reflecting surface at an angle of reflection which is substantially constant during movement of the curved reflecting surface across the path, thereby producing an aiming spot of enhanced visibility brighter than said visibility.

10. The component of claim 9, wherein the curved reflecting surface is a circular arc smoothly extending between the two generally planar reflecting surfaces.

11. In a method of electro-optically reading indicia by reflecting a light beam off a plurality of generally planar light reflecting surfaces rotatable about an axis to sweep the light beam at a visibility across the indicia during a multiple scan line mode of operation, a method of producing an aiming spot of enhanced visibility brighter than said visibility during a single scan line mode of operation, the method comprising the steps of:

a) producing the light beam with an actuatable light source;
   b) directing the light beam along a path to the generally planar reflecting surfaces and to the indicia to be read;
   c) mounting a curved light reflecting surface for joint rotation with and between two of the generally planar reflecting surfaces, and moving the curved reflecting surface across the path;
   d) actuating the light source during the single line mode to produce the light beam during movement of the curved reflecting surface across the path; and
   e) configuring the curved reflecting surface to have a center of curvature on the axis for reflecting, and not sweeping across the indicia, the light beam incident on the curved reflecting surface at an angle of reflection which is substantially constant during movement of the curved reflecting surface across the path, thereby producing the aiming spot of enhanced visibility.

12. The method of claim 11, and the step of successively arranging a plurality of stationary light reflectors in a circumferential direction about the axis, and wherein the reflectors receive light reflected from the reflecting surfaces and direct the received light toward the indicia to be read.

13. The method of claim 11, and the step of incorporating the reflecting surfaces into a rotary scan component having the reflecting surfaces successively arranged in a circumferential direction about the axis.

14. The method of claim 13, and further comprising the step of providing additional curved light reflecting surfaces, each having the same center of curvature and each being mounted for joint rotation with and between adjacent pairs of the generally planar reflecting surfaces.

15. The method of claim 14, wherein the configuring step is performed by configuring each curved reflecting surface as a circular arc.

16. The method of claim 11, wherein the actuating step is performed by actuating the light source before the curved reflecting surface enters the path, and deactuating the light source after the curved reflecting surface exits the path.

17. The method of claim 11, and the step of maintaining rotation of the reflecting surfaces during both modes, and wherein the light source produces the light beam during the multiple line mode, and wherein the light source produces the light beam during the single line mode during movement of the curved reflecting surface across the path.

* * * * *